United States Patent [19]
Braunberger

[11] 3,722,191
[45] Mar. 27, 1973

[54] WINDROWING MEANS FOR AGRICULTURAL MACHINE

[75] Inventor: Benjamin A. Braunberger, West Bend, Wis.

[73] Assignee: Gehl Company, West Bend, Wis.

[22] Filed: Feb. 25, 1972

[21] Appl. No.: 229,466

[52] U.S. Cl..................56/189, 56/DIG. 1, 56/372
[51] Int. Cl..............................................A01d 43/00
[58] Field of Search.....56/1, DIG. 1, 14.3, 14.4, 192, 56/372, 189

[56] References Cited

UNITED STATES PATENTS

| | | | |
|---|---|---|---|
| 2,854,046 | 9/1958 | Devorak | 56/192 X |
| 2,911,780 | 11/1959 | Brady | 56/1 |
| 2,918,776 | 12/1959 | Coultas | 56/192 |
| 3,059,403 | 10/1962 | Bamford et al. | 56/366 |
| 3,092,946 | 6/1963 | Mathews | 56/14.9 |
| 3,141,284 | 7/1964 | Reynolds | 56/354 |
| 3,383,844 | 5/1968 | Glass et al. | 56/14.4 |

Primary Examiner—Russell R. Kinsey
Attorney—James E. Nilles

[57] ABSTRACT

A tractor drawn and powered agricultural machine, such as a mower-conditioner for hay-like crops, comprises a main frame having a pair of spaced apart side walls between which a sickle mower, a tine reel, a pair of conditioning rolls, a crop gathering hood and windrowing means, and a pair of transport wheel assemblies are mounted. Operating power from the tractor is supplied through a rotatable power take-off shaft and clutches to a transmission unit which is connected to and drives the conditioning rolls and the sickle mower. The crop gathering hood and windrowing means are designed to deliver the crop in a swath or windrow in a fluffy condition which promotes drying and include adjustable side and rear shields.

6 Claims, 17 Drawing Figures

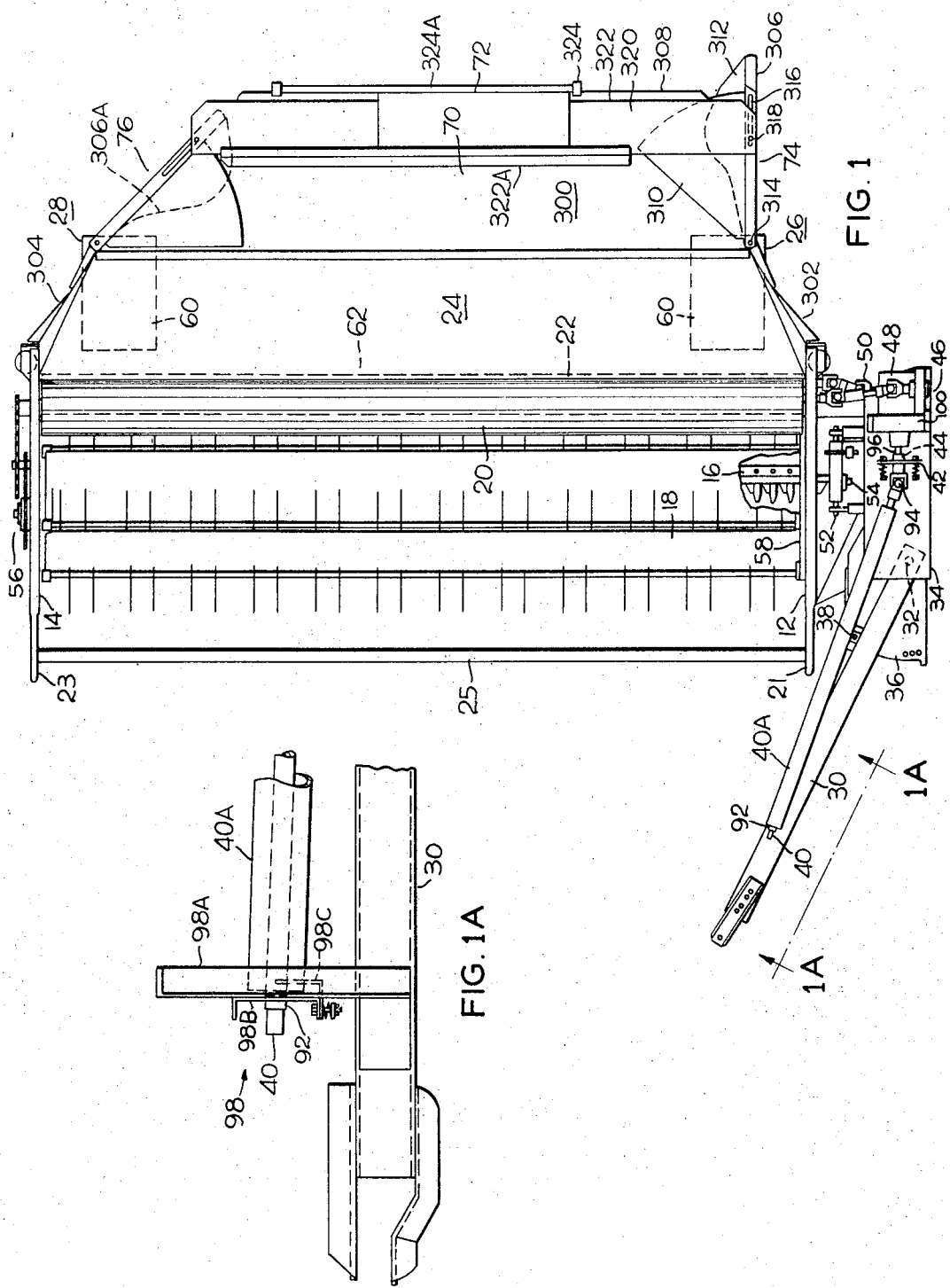

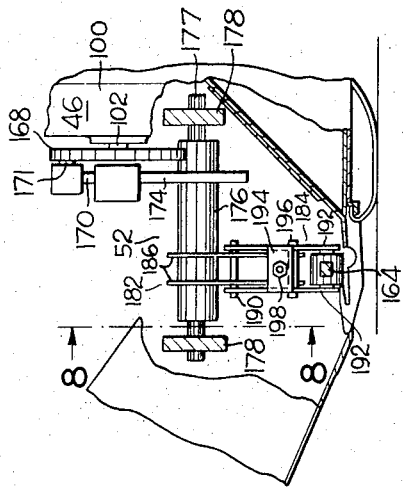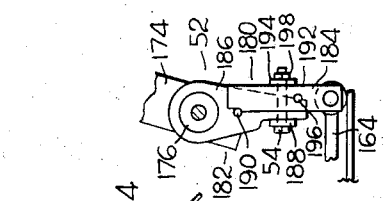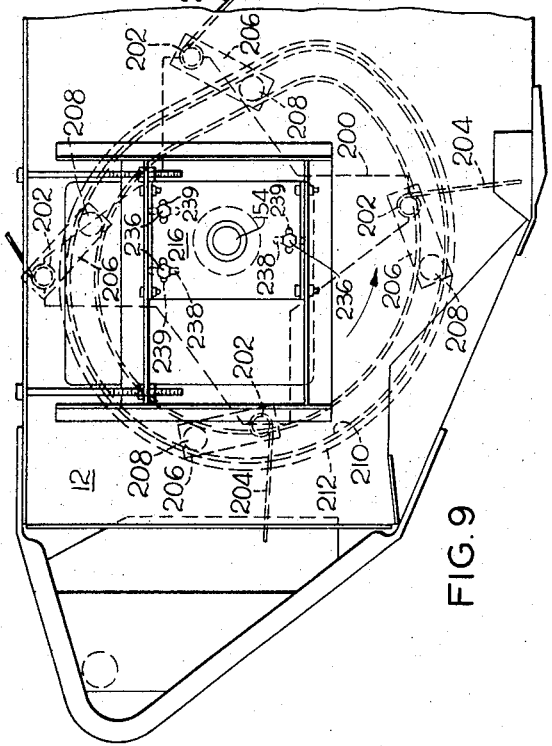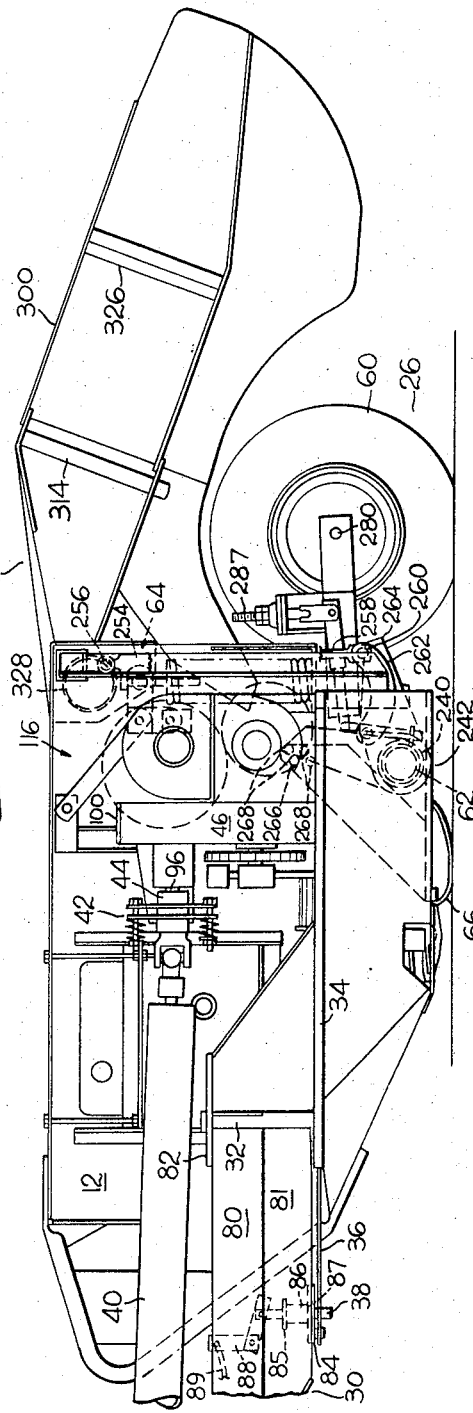

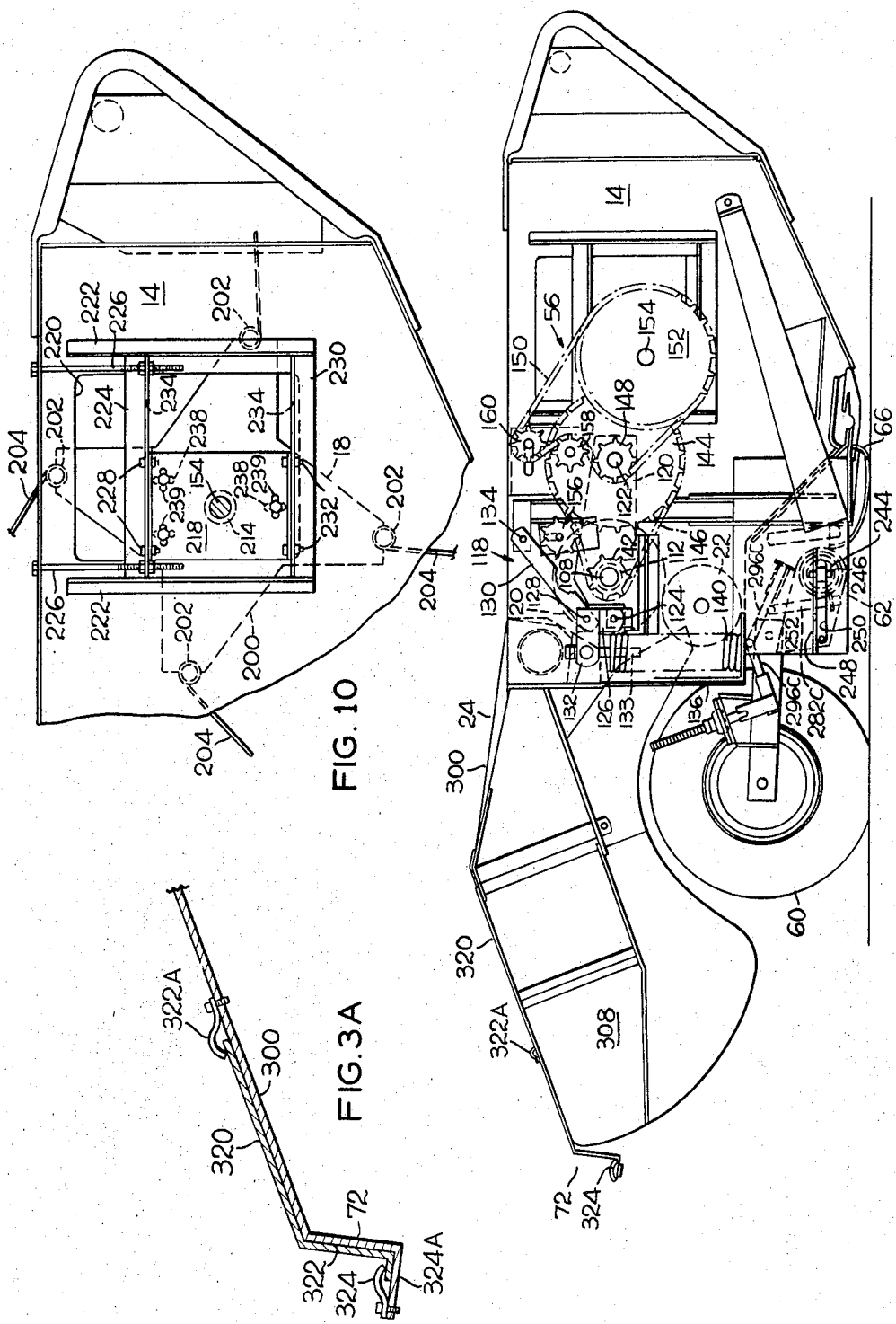

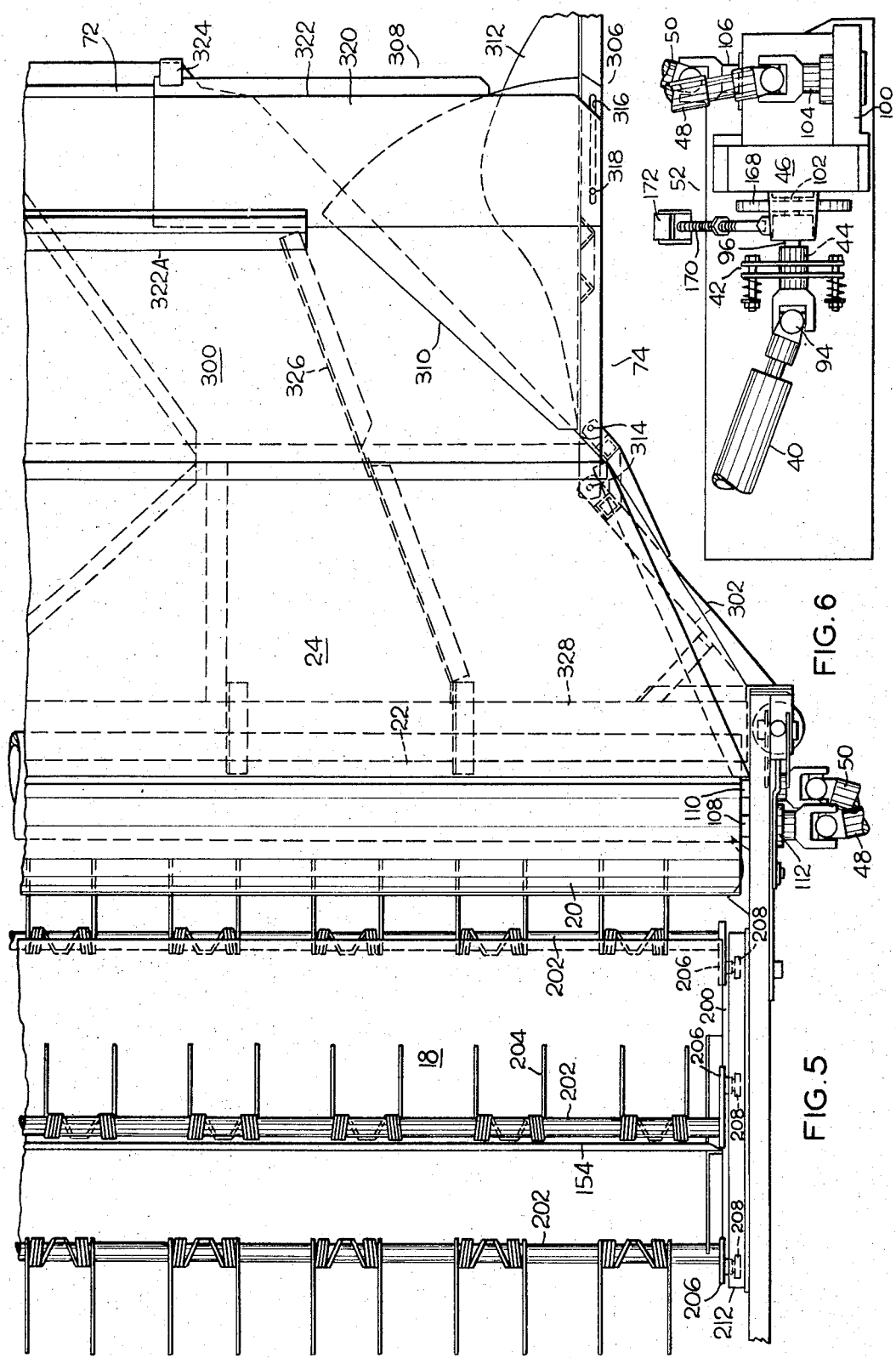

WINDROWING MEANS FOR AGRICULTURAL MACHINE

BACKGROUND OF THE INVENTION

1. Field of the Invention

This invention relates generally to agricultural machines, such as mower-conditioners which are used to mow, condition and windrow hay or similar crops. In particular, it relates to adjustable windrowing means therefor.

2. Prior Art

Mower-conditioner machines of the aforesaid character are known in the prior art and are used to mow the crop, to immediately condition it by cracking its stems to facilitate drying, and to redistribute the conditioned crop in the field either in a full swath or in windrows. Generally considered, such machines are tractor-drawn and tractor-powered and comprise a main frame supported on ground or transport wheels. On the main frame are mounted operating components such as a reciprocating sickle cutter or mower for cutting the crop, a rotating tine reel for gathering up the cut crop, a pair of rotating conditioning or crushing rolls between which the cut crop is fed by the tine reel, and a crop gathering hood including windrowing means for depositing the conditioned crop back onto the field for drying. The mower conditioner includes a drawbar for connection to the tractor and power for operating the sickle bar, tine reel and conditioning rolls is provided from the tractor through a rotatable power take-off shaft. A mower conditioner disclosed in bulletin No. 2693 35 M2-69 issued by the Gehl Company of West Bend, Wis., exemplifies one type of prior art device. U. S. Pat. No. 3,375,643 issued Apr. 2, 1968 to McCarty et al. discloses another type of prior art mower-conditioner.

While prior art mower conditioners are generally satisfactory for their intended purpose, they incorporate features which it is desirable to improve upon and they also lack certain features which it is desirable to provide to enhance their over-all performance and versatility. For example, in some, the internal configuration of the crop gathering hood and the location and shape of the windrowing shields is such that the cut crop is deposited in tight, airless, irregular swaths or windrows which are slow to dry and difficult to pick up or recover. It is desirable, therefore, to provide new and improved windrowing means for mower-conditioner or similar machines which overcome the aforementioned difficulties and have other advantages as hereinafter described.

SUMMARY OF THE INVENTION

A tractor drawn and powered mower-conditioner machine for hay crops or the like, generally comprises a main frame having a pair of spaced apart side walls between which a sickle mower, a tine reel, a pair of conditioning rolls, a crop gathering hood and windrowing means, and a pair of transport wheel assemblies are mounted. In accordance with the present invention, a preferred embodiment comprises the following features. Operating power from the tractor is supplied through a rotatable power take-off shaft and clutches to a transmission unit which is connected to and drives the conditioning rolls and sickle mower. The tine reel, which is adjustably mounted on the side walls, is chain driven from the upper conditioning roll and tine pitch is adjustable by adjustable cam means. The two transport wheel assemblies, each of which includes an independently sprung wheel, are mounted on a rockshaft which is rotatably adjustable by means of a remotely controlled hydraulic actuator to change the height of the main frame above ground. Adjustable skid shoes beneath the main frame determine the minimum height of the main frame above ground.

Adjustable windrowing means are provided at the rear of the main frame and a cut crop is propelled rearwardly thereinto by the conditioning rolls to be directed downwardly onto the ground into windrows. The windrowing means comprise a crop gathering hood having a roof narrower at its rear than at its front. A pair of side shields are provided, one on each side of the hood, and each side shield comprises a roof and a depending portion. Means are provided for pivotably connecting each side shield to the hood. A pair of movable rear shields are also provided, one for each side of the hood, and each rear shield comprises a roof and a depending portion. Each rear shield is supported between the hood and an associated side shield, and means are provided for connecting each rear shield to its associated side shield so that each rear shield is movable with its associated side shield between open and closed positions. Each of the end shields is slidably movable transversely to the fore and aft center line of the machine and guide means are provided on the hood for guiding the sliding movement of the end shields. The end shields move along a path which is normal to said center line and the means for connecting each rear shield to its associated side shield effects conversion of the pivotal or rotary motion of the side shield into linear motion of the end shield. The hood comprises a depending portion at the rear thereof which cooperates with the depending portions of the rear shields to provide a straight fluffer batt of variable width at the rear of the machine. The roofs of each side shield and its associated end shield cooperate with the roof of the hood to provide an unbroken surface.

THE DRAWINGS

FIG. 1 is a top view of a mower-conditioner made in accordance with the present invention, and FIG. 1A is an enlarged, side elevational view taken along line 1a–1a in FIG. 1;

FIG. 2 is an enlarged, left side elevational view of the conditioner;

FIG. 3 is an enlarged, right side elevational view of the conditioner, and FIG. 3A is an enlarged, cross-section view of a portion of the windrowing means as shown in FIG. 3;

FIG. 5 is an enlarged plan view of a portion of the left side of the mower conditioner;

FIG. 6 is an enlarged plan view of the power transmission unit shown in FIG. 1;

FIG. 7 is an end, elevational view of a portion of the power transmission unit shown in FIG. 6;

FIG. 8 is a view taken along line 8—8 of FIG. 7;

FIG. 9 is an enlarged view of a portion of the front end of the left side of the mower-conditioner and shows the tine reel mounting means;

FIG. 10 is an enlarged view of a portion of the front end of the right side of the mower-conditioner and shows the tine reel mounting means;

DESCRIPTION OF THE INVENTION

GENERAL ARRANGEMENT

Figure 4:
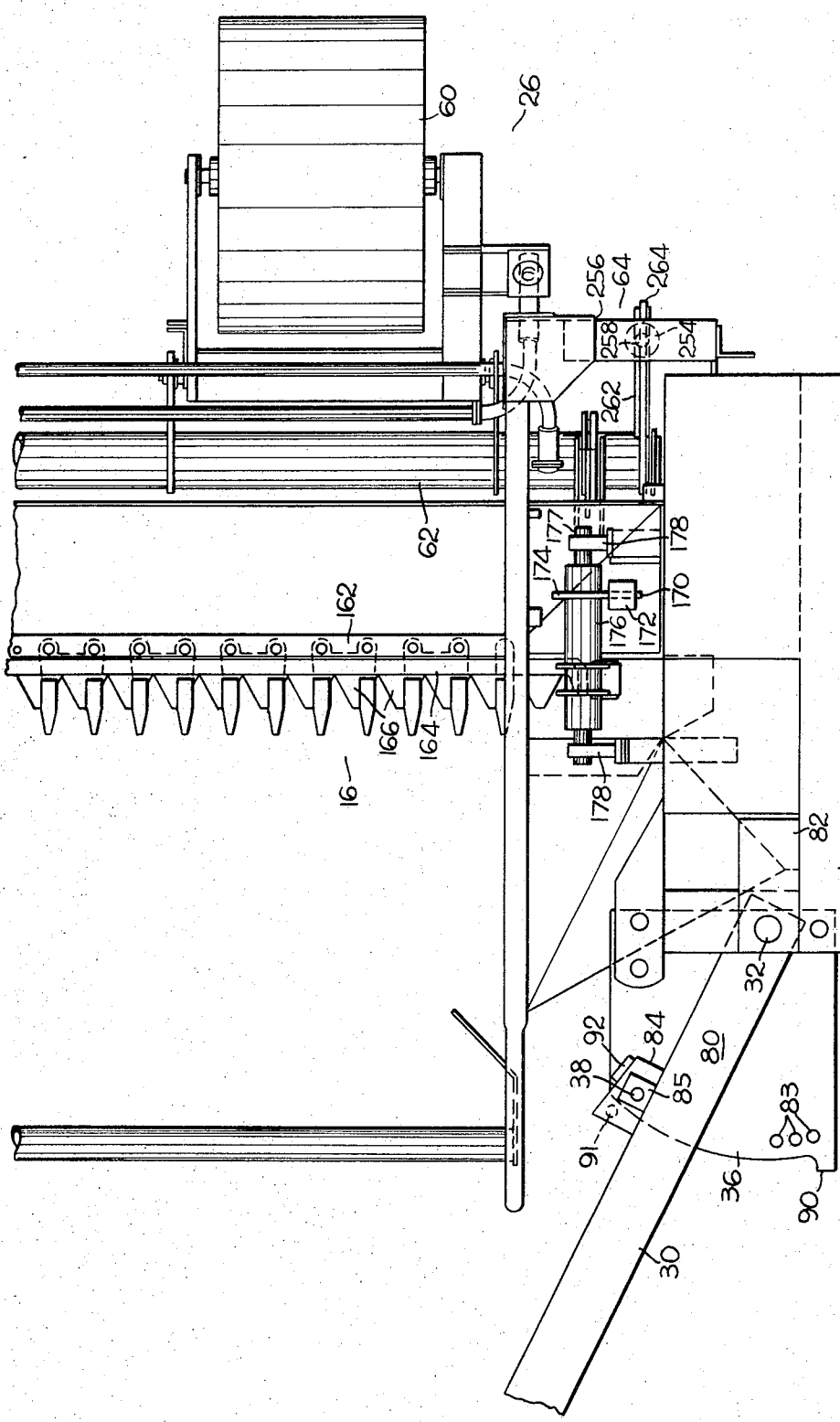
FIG. 4 is an enlarged plan view, with certain upper components omitted, of the left side of the mower conditioner.

Referring to FIG. 1, there is shown a top plan view of a tractor drawn and powered mower-conditioner for mowing, conditioning and windrowing hay or similar crops which comprises a main frame having a pair of spaced apart side walls 12 and 14 between which a sickle mower 16, a tine reel 18, a pair of conditioning rolls 20 and 22, crop guiding and windrowing means 24 at the rear thereof, and a pair of transport wheel assemblies 26 and 28 are mounted. Crop dividers 21 and 23 are provided at the forward edges of the walls 12 and 14, respectively, and a crop bumper 25 is mounted therebetween. A hitch pole or tongue 30 is pivotably connected by a non-binding vertical hinge pin 32 to a support plate 34 on the main frame outboard of side wall 12 and is laterally movable to selected positions wherein it is releasably engaged to a quadrant plate 36 by a remotely operable pin 38. Operating power from the tractor is supplied through a rotatable power take-off shaft 40 and clutches 42 and 44 to a transmission unit 46 comprising enclosed gears which is mounted on the main frame support plate 34 outboard of side wall 12. The transmission unit 46 is connected to and drives the upper and lower conditioning rolls 20 and 22 by means of universal drive shafts 48 and 50, respectively. Upper conditioning roll 20 is spring mounted, as hereinafter explained, so as to be relatively movable and self-adjusting with respect to lower roll 22 to thereby accommodate passage of crops of variable density and foreign objects. The transmission unit 46 is also connected to and drives the sickle mower 16 through a reciprocating pitman drive 52 which includes a breakaway bolt 54 which breaks if the sickle is overloaded. Tine reel 18, which is adjustably mounted on the side walls 12 and 14, as hereinafter explained, is driven by a chain drive 56 from upper conditioning roll 20 and tine pitch is adjustable by adjustable cam means 58 mounted inside of side wall 12. The two transport wheels assemblies 26 and 28, each of which includes an independently sprung wheel 60, are mounted on a rockshaft 62 which is rotatably adjustable by means of a remotely controlled hydraulic actuator 64 (FIG. 2) to change the height of the main frame above ground. Adjustable skid shoes, such as shoe 66 (FIG. 2), beneath the main frame determine the minimum height of sickle mower 16 above ground. Rockshaft 62 is adjustably movable laterally, as hereinafter explained, to change the angle between its axis and the side walls 12 and 14 of the main frame to account for differences in drag offered by various field conditions. The side walls of the crop guiding means are curved internally near the rear thereof to insure movement of material inward as it falls. The crop guiding and windrowing means 24 comprise a hood 70, a downwardly depending fluffer batt 72, and independently adjustable fluffer batt assemblies 74 and 76 disposed on each side of the hood to control swathing and windrowing.

It is to be understood that in operation, the mower-conditioner is drawn or moved over the ground in a leftward direction with respect to FIG. 1. Furthermore, referring to FIG. 1, the side walls 12 and 14 of the main frame are considered to be at the left and right sides of the machine, respectively. The left and right ends of the machine, with respect to FIG. 1, are in actuality the front and rear ends, respectively, of the machine.

DRAWBAR ARRANGEMENT

Referring to FIGS. 3 and 4, hitch pole 30, which comprises an elongated box girder 80 having a shorter box girder 81 welded to its underside, is pivotably connected to support plate 34 by hinge means such as vertical hinge pin or bolt 32 which extends through holes in the hitch pole and holes in the support plate and a bracket 82 on the support plate. Thus, hitch pole 30 can be pivoted freely horizontally to desired positions but is immovable vertically with respect to the main frame because of the relatively great vertical depth of the hitch pole and the length of pin 32 and because support plate 34 and bracket 82 overlap the end of the hitch pole. Means are provided to securely position hitch pole 30 in specific positions and comprise a plurality of spaced apart radially arranged holes 83 in quadrant plate 36. Plate 36 is rigidly attached to and extends forwardly of support plate 34 in supporting relationship beneath hitch pole 30. The positioning means further comprise remotely operable movable pin 38 which is vertically mounted on a side of hitch pole 30 by means of vertically spaced apart plates 84 and 85. Pin 38 is releasably engagable with any one of the holes 83 in quadrant plate 36. Pin 38 is biased downwardly by a compression spring 86 disposed between upper plate 85 and a shoulder 87 on the pin to prevent it from accidentally disengaging from a hole 83. Pin 38 is movable upwardly against the bias of spring 86 to disengaged position by means of a lever 88 which is pivotably connected to pin 38 and is pivotably mounted on hitch pole 30. Lever 88 is remote operable from the tractor by means of a lanyard 89. Travel limiting means are provided to prevent drawbar 30 from being swung too far horizontally in either direction when pin 38 is disengaged from the holes 83. Such means comprises a projection or abutment 90 at the outer edge of quadrant plate 36 which is engagable with a stop pin 91 on plate 84 on hitch pole 30. Such means further comprises another abutment or projection 92 at the inner edge of quadrant plate 36 which is engagable with plate 84.

POWER TRANSMISSION ARRANGEMENT

FIGS. 1, 1A, 2 and 6 show the means, including power take-off shaft 40 and power transmission unit 46, for powering the mower-conditioner from the tractor. Shaft 40 has a bearing 92 at one end, shown in FIGS. 1 and 1A, which adapts it for connection to conventional power take-off means (not shown) on the tractor and has a universal joint 94 at its other end by which it is connected, through torque limiter slip clutch 42 and internal over-running clutch 44 to rotate or drive an input shaft 96 on the front of transmission unit 46. Clutch 42 slips and prevents power transmission from shaft 40 to shaft 96 if the total machine load exceeds safe limits. Clutch 44 allows for continued rotation or over-run of the conditioning rolls 20 and 22 (which have high inertia) when rotation of the power take-off shaft 40 is abruptly stopped by a braking force applied from the tractor. Since the power take-off shaft 40 is above and almost parallel to hitch pole 30, it is conveniently supported on an adjustable standard 98 shown in FIG. 1A, so as to match the tractor power take-off height above the hitch. Standard 98 comprises an upright member 98a rigidly secured to hitch pole 30 on which a support bracket 98b is adjustably mounted. Bracket 98b is provided with bearing 92 which engages the power take-off shaft 40. FIG. 1A illustrates a stationary guard tube 40a inside of which the power take-off shaft 40 turns. Bracket 98c ties the guard tube to support bracket 98b.

Power transmission unit 46 comprises a gear box or housing 100 having suitable gears therein for transmitting power from its input shaft 96 on the front of the gear box to power output shafts 104 and 106, best seen in FIG. 6, on the inner side of the gear box and to a power output shaft 102, shown in FIGS. 6 and 7, on the front of the gear box. Unit 46 serves as a conveniently located single point source of operating power which, since it comprises enclosed gears instead of complicated exposed chain and belt drives, is safer and more maintenance-free. As FIGS. 5 and 6 show, output shaft 104 is connected by universal drive shaft 48 to an axle 108 for upper conditioning roll 20. Output shaft 106 is connected by universal drive shaft 50 to an axle 110 for lower conditioning roll 22.

The ends of axle 110 of lower conditioning roll 22 are journalled in suitable bearings which are understood to be mounted at fixed locations on the side frames 12 and 14 of the mower-conditioner and the lower roll rotates about a fixed axis. The ends of axle 108 of upper conditioning roll 20 are journalled in bearings, such as bearing 112 shown in FIGS. 3 and 5, which are movably mounted on identical roll-pressure assemblies 116 and 118, respectively, shown in FIGS. 2 and 3, provided on the outer sides of the side walls 12 and 14, respectively, of the main frame. Thus, each end of upper roll 20 is relatively movable and self-adjusting with respect to lower roll 22 to accommodate the passage of crops of variable density or foreign objects between the rolls. As FIG. 3 shows, assembly 118 comprises a roll support arm 120 on which bearing 112 is mounted and which is pivotably connected at one end by a stud 122 to side wall 14 of the main frame. The other end of roll support arm 120 is pivotably attached by a pin 124 to a first L-shaped link 126 which, in turn, is pivotably connected by a pin 128 to a second link 130. Second link 130 is pivotably connected by a pin 134 to side wall 14. Link 126 has a leg which is horizontally disposed and is connected to a rod 133 by a pin 132. Rod 133 is connected to a roll pressure spring 140 which normally tends to bias rod 133 (and conditioning roll 20) downwardly to a predetermined position. Assembly 116, shown in FIG. 2 is constructed and operates the same as assembly 118. Thus, both ends of upper conditioning roll 20 are independently movable upwardly against the bias of the roll pressure springs to accommodate passage of crops of variable density or foreign objects but then return to their normal positions to insure proper spacing between the conditioning rolls 20 and 22. The spring bias maintains roll pressure on the crop to crack stems for rapid drying.

As hereinbefore mentioned, the linkage assemblies 116 and 118 are identical. However, shaft or pin 122 of assembly 118, shown in FIG. 3 at the right side of the machine also serves as a convenient means for mounting portions of chain drive 56 by which upper conditioning roll 20 drives tine reel 18. Referring to FIGS. 1 and 3, chain drive 56 comprises a driving sprocket 142 mounted on the right end of and rotatable with axle 108 of upper roll 20. A large idler sprocket 144 is mounted on stud 122, hereinbefore referred to, and is connected to driving sprocket 142 by a first drive chain 146. A small idler sprocket 148, attached to and rotatable with sprocket 144, is connected by a second drive chain 150 to a sprocket 152 which is mounted on and effects rotation of the axle 154 of the tine reel 18. Since upper conditioning roll 20 and the tine reel 18 are both independently adjustable or movable with respect to the main frame of the machine, and therefore, with respect to the idler sprocket 144 and 148, means are provided to keep the drive chains 146 and 150 taut. Idler 156 is adjustably mounted on arm 120 and maintains a constant position relative to shafts 108 and 122 when the conditioning roll 20 moves about center 122. Idler 158 is fixed to sidewall 14. Idler 160 is adjustably fixed to side wall 14 and must be moved when the reel is moved.

FIGS. 1, 2 and 4 show that transmission unit 46 is connected to drive sickle mower 16 through a reciprocating pitman drive 52, details of which are shown in FIGS. 6, 7 and 8. As FIG. 4 shows, sickle mower 16 comprises a stationary cutter bar 162 which is mounted between side walls 12 and 14 near the bottom of the machine. A reciprocable sickle 164 having a plurality of blades 166 thereon is mounted on cutter bar 162 and is reciprocably movable with respect thereto in a direction transverse to the direction of travel of the machine. As FIGS. 4 and 8 show, the left end of movable sickle 164 is pivotably connected to and movable by pitman drive, rocker assembly or walking beam means 52. More specifically, as FIGS. 6 and 7 show, power output shaft 102 on the front of gear box 100 of power transmission unit 46 is provided with a flywheel 168 to which one end of a generally horizontally disposed upper pitman rod 170 is pivotably connected by a crankpin 171 fixed in the flywheel so that pitman rod 170 reciprocates longitudinally as shaft 102 and flywheel 168 rotate. The other end of upper pitman rod 170 is pivotably connected by connecting means 172 to the upper end of a link or pitman arm 174 which, as FIGS. 4, 7 and 8 show, has its lower end rigidly connected, as by welding, to a rocker shaft 176 which takes the form of a tube having internal bearings. Rocker shaft 176 is supported for oscillation about its axis on a stationary support shaft 177 supported in clamp blocks 178 which are secured at the outside of side wall 12 to the main frame of the machine. A lower pitman arm assembly 180 comprising an upper portion 182 and a lower portion 184 secured thereto is connected between rocker shaft 176 and the left end of reciprocably movable sickle 164. As FIGS. 7 and 8 show, upper portion 182 of pitman arm assembly 180 comprises a pair of spaced apart side plates 186 which are interconnected by a face plate 188 and a stop rod 190 which extends beyond the side plates. The side plates 186 are welded to rocker shaft 176. Lower portion 184 of assembly 180 also comprises a pair of spaced apart side plates 192 which are interconnected by a face plate 194, and a stop rod 196 which extends beyond the side plates. Upper portion 182 and lower portion 184 of lower pitman arm assembly 180 are rigidly engaged or secured together as shown in FIGS. 7 and 8, by break-away bolt 54 having a nut 198 which engage both face plates 188 and 194. Break-away bolt 54 and nut 198, when tightened against the face plates 188 and 194, force the edges of the side plates 186 of upper portion 182 against stop bar 196 of lower portion 184 and also force the side plates 192 of lower portion 184 against stop bar 190 of upper portion 182. Bolt 54 is understood to be designed or selected so that it breaks under tension if sickle mower 16 is overloaded during operation. Bolt 54 breaks as a result of the force exerted against its head and nut 198 by the face plates 188 and 194, respectively, as upper portion 182 and lower portion 184 try to separate. Bolt 54 is located between the stop pins 190 and 196 such that there is an equal amount of tension on the bolt regardless of in which direction the sickle is moving.

TINE REEL ADJUSTMENT

Referring to FIGS. 5, 9 and 10, tine reel 18 comprises a tine reel shaft 154 having a plurality of spiders 200 secured near each end between which a plurality of tine bars 202 are rotatably mounted in radial arrangement. Each tine bar 202 carries a plurality of rigidly attached tine springs 204 and each tine bar has a crankarm 206 rigidly connected near its left end on which a cam roller 208 is rotatably mounted. Each cam roller 208 engages and is movable in a cam track 210 on a cam carrier plate 212.

The ends of the tine reel shaft 154 are journalled in bearings, such as bearing 214 shown in FIG. 10, which are provided on adjustable reel carrier plates 216 and 218, respectively, which are mounted on the side walls 12 and 14, respectively, of the main frame, as FIGS. 9 and 10, respectively, show. Since the reel carrier plates 216 and 218 are similarly constructed and mounted on their associated side walls, only carrier plate 218, shown in FIG. 10 will be described in detail. Side wall 14 has a rectangular opening 220 and two vertical guides 222 are secured to the side wall on either side of and spaced from the opening. An upper reel carrier 224 is supported between the guides 222 on side wall 12 by hanger bolts 226. Reel carrier plate 218 is supported on upper reel carrier 224 by bolts 228. A lower reel carrier 230 is connected to reel carrier plate 218 by bolts 232 and is disposed between the guides 222. Hanger bolts 226 permit vertical adjustment or positioning in either direction of carrier plate 218 and tine reel 18. Adjustment slots 234 in the upper and lower reel carriers 224 and 230 permit horizontal adjustment or positioning in either direction of carrier plate 218 and tine reel 18 to suit particular crop conditions. For example, tine reel 18 would be moved forward and down so that the tines 204 could pick up a downed crop.

FIG. 9 shows that cam carrier plate 212 is connected to carrier plate 216 on the left side of the machine by a plurality of bolts 236 which extend through a plurality of vertical slots 238 in the cam carrier plate 212 and a plurality of horizontal slots 239 in reel carrier plate 218. The horizontal slots 239 permit cam plate 212 to be adjusted or moved horizontally in either direction with respect to tine reel 18 to change the angle of the tine springs 204 relative to the conditioning rolls 20 and 22. The vertical slots 238 permit cam plate 212 to be adjusted or moved vertically in either direction with respect to tine reel 18 to thereby change the angle of the tine springs 204 relative to the ground or crop. This adjustment is in addition to the normal timing adjustment provided by rotation of the cam track. Since cam plate 212 is carried with carrier plate 216 when the latter is adjusted, the tine spring angle adjustment is not changed or disturbed when the reel is repositioned. However, tine spring angle can be independently adjusted, if so desired, to suit specific crop conditions.

WHEEL ASSEMBLY ARRANGEMENT

FIGS. 1, 2, 3, 4 and 11 show that the transport wheel assemblies 26 and 28, each comprising a wheel 60, are mounted on rockshaft 62 which is pivotably mounted behind the header frame. Each wheel 60 is provided with resilient suspension means so that it can more readily and independently adapt to changes in the contour of the ground. Rockshaft 62 is adjustably rotatable about its axis by means of hydraulic actuator or lift cylinder 64 (FIG. 2), which is remotely controllable from the tractor to selectively position the wheel assemblies 26 and 28 with respect to the main frame and thereby regulate the height of the main frame above ground and also regulate the force exerted by the skid shoes 66 on the ground. Rockshaft 62 is also adjustable laterally to change the angle between it and the sickle mower 16 (to which it is normally parallel) and thereby change the lead of the mower to compensate for the drag offered by various field conditions which cause abnormal tracking of the machine.

As FIG. 2 shows, the left end of rockshaft 62 is journalled in a bearing means 240 which is pivotally connected as at 242 to the main frame outboard of side wall 12. As FIG. 3 shows, the right end of rockshaft 62 is journalled in a bearing means 244 which is adapted to be secured by a bolt 246 to a plate 248 (at any one of a plurality of laterally arranged adjustment positions on the plate) mounted side wall 14 to achieve horizontal adjustment of the rockshaft. Bearing means 244 comprises a tongue which extends through a slot 250 in side wall 14 beneath plate 248 and the latter is provided with a series of adjustment holes 252 for engagement with bolt 246 on the tongue of bearing means 244. Rockshaft 62 is adjustable to a maximum angle of about 5° with respect to sickle mower 16.

As FIGS. 2 and 4 show, rockshaft 62 is rotatably adjustable about its axis for the purpose explained hereinbefore by means of hydraulic actuator 64 which has its cylinder 254 pivotably anchored at a point 256 to the main frame of the machine. Piston rod 258 of actuator 64 is pivotably connected by a lift cylinder pin 260 to a lever arm or actuator release link 262 which is secured to rockshaft crank arm or transport lift arm 264 which is rigidly connected to rockshaft 62. Retraction of piston rod 258 effects counterclockwise rotation of rockshaft 62 to reduce the bias thereon. Rockshaft 62 is limited as regards counterclockwise rotation by the location of a stop pin 266 which can be placed at any one of four positioning holes 268 in the side of the main frame. Stop pin position is selected to correspond to skid shoe position.

Left transport wheel assembly 26, shown in FIGS. 2, 4, 11 and 13 is understood to be generally similar, except as noted below, to right transport wheel assembly 28 but is a reverse or mirror image thereof. Assembly 26 comprises a pair of bias arms such as 276 which are spaced apart from each other and are rigidly secured by welding to rockshaft 62. The bias arms 276 are provided with upwardly extending extensions such as 279 which are secured to the bias arms as by bolts 283. The extensions 279 are provided with bearings such as 277 which support a wheel fork shaft or axle 274. A wheel fork 272 comprising two side arms such as 272a and a wheel axle 280 is pivotably mounted on wheel fork shaft 274. Left transport wheel 60 is mounted for rotation on wheel axle 280. Wheel fork 272 and its wheel 60 are moved to desired positions as a result of rotation of rockshaft 62 as hereinbefore described. Resilient biasing means in the form of a torsion bar of float spring 282 are provided for wheel fork 272. Torsion bar 282 comprises an intermediate section 282a and end sections 282b and 282c which extend at right angles from the intermediate section. Torsion bar 282 is supported by or in a slot 283a in a plate 284 at the end of arm 272a of wheel fork 272 and is secured in place therein by a keeper 284a which is bolted at 285 to plate 284. The extension 282b of torsion bar 282 is disposed in a socket 286 which is pivotably connected by a clevis pin 286a to a clevis or torsion spring take-up bolt 287 which is mounted on a clevis support or adjustment base 288 attached to arm 272a of wheel fork 272. The other end or extension 282c of torsion bar 282 is secured in a hole 289 in a plate 290 which is welded to a bias arm 292 for right transport wheel assembly 28. The second element of the necessary supporting couple for extension 282c is provided by the bias arm extension 298a which is somewhat different on the right end from that illustrated as 279 on the left end. There is just enough difference so that the two springs 296 and 282 pass each one with sufficient clearance. As will appear, one spring passes through a clip in the end of the wheel fork and the other passes through a clip on the top of the wheel fork. Clevis 287 is vertically adjustable to increase or decrease the tension of torsion bar 282 by means of a nut 294 which takes on to the threaded end of clevis 287 and bears against a self-aligning seat 294a for the nut. Tightening of nut 294 causes upward movement of clevis 287 and corresponding counterclockwise rotation (with respect to FIG. 2) and increases tension from torsion bar 282. Torsion bar 282 serves to spring load wheel fork 272 and permit it (and its wheel 60) to move resiliently with respect to rockshaft 62. Extension 282b, being adjustably fixed relative to wheel fork 272, while extension 282c is fixed relative to bias arm or rockshaft, causes resilient member 282a to impart a lifting tendency of wheel fork axle 274 clockwise relative to axle 280.

Figure 11:
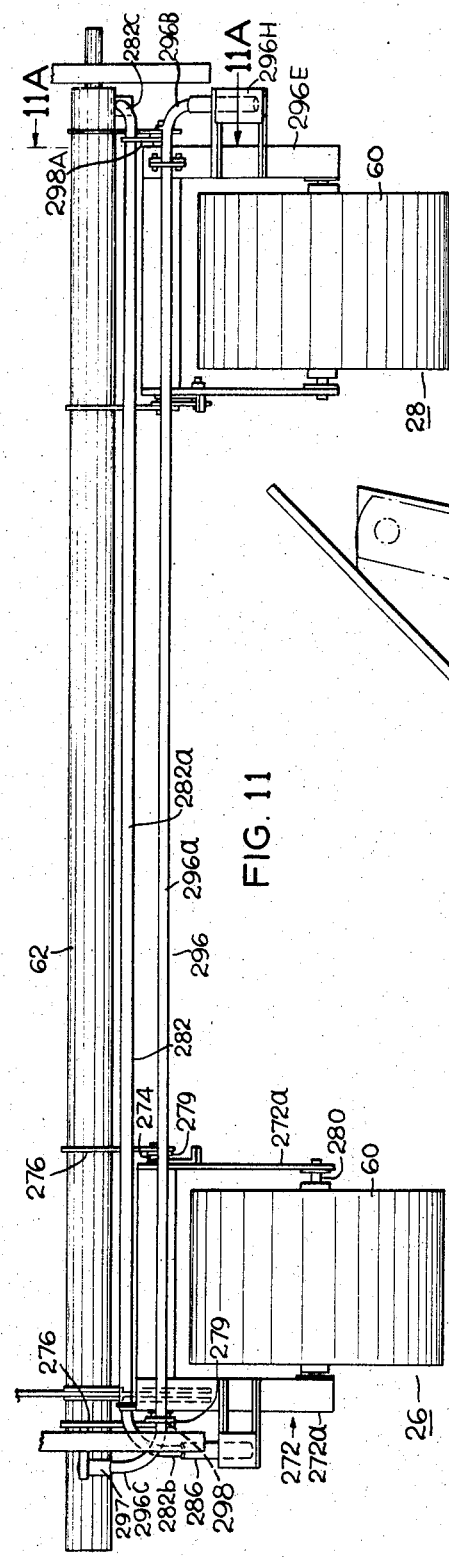
FIG. 11 is a top plan view of the wheel assembly arrangement of the mower-conditioner with portions of the latter broken away.
Figure 11A:
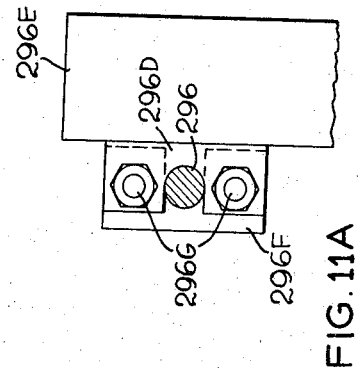
FIG. 11a is an enlarged sectional view taken along line 11a–11a in FIG. 11.

As FIG. 11 shows, another torsion bar 296 is provided for right transport wheel assembly 28 and is secured thereto in a manner similar to that in which torsion bar 282 is secured to left transport wheel assembly 26. Torsion bar 296 for the right wheel 28 has an intermediate section 296a which runs parallel to but is spaced above that of torsion bar 282. The end or extension 296c of torsion bar 296 is secured to a bracket or anchor 297 on bias arm 276 of left transport wheel assembly 26. Torsion bar 296 is supported near its left end (with respect to FIG. 11) in an opening or hole 298 in extension 279 on bias arm 276. The other end 296b of the right end wheel spring 296 is supported in a cradle 296d which in turn is welded to the wheel fork 296e and is held in the cradle by a clip 296f through which the spring rotatably passes, and which clip is secured by bolts 296g to the cradle.

The end of spring end 296b is held in tubular socket 296h, which socket is similar to the opposite socket 286.

Thus the left and right transport wheel assemblies 26 and 28 respectively are independently movable and adjustable. In practice, the clevises or take-up bolts for each of the torsion bars 282 and 296 are adjusted or set so as to give sufficient moment to the torsion bars so that the wheel assemblies 26 and 28 and hitch pole 30 carry all but about 100 lbs. of the total weight of the machine. A pressure of about 100 lbs. (50 lbs. at each end) is maintained on the skid shoes 16. Independent adjustment of the wheel assemblies 26 and 28 enables the machine to be balanced. This is necessary because, as FIG. 1 shows, hitch pole 30 is connected on the left outboard side of the machine and as its position is changed, weight distribution on the three supporting points (the two wheels and the hitch pole) changes.

Figure 12:
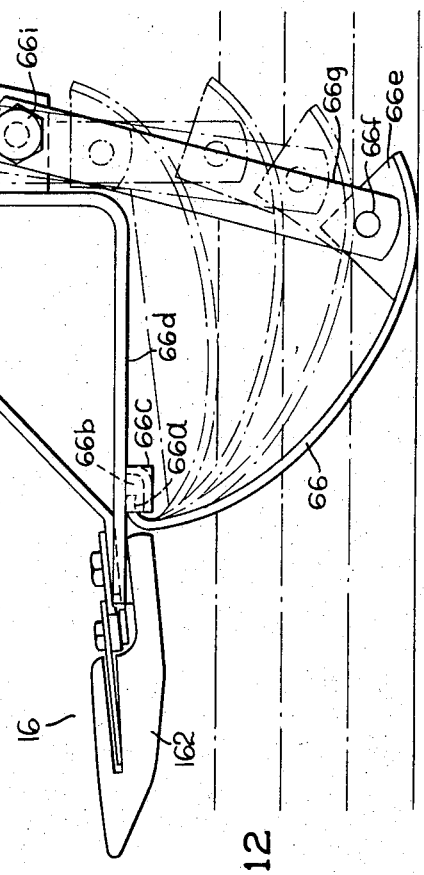
FIG. 12 is an enlarged cross-sectional view of the adjustable skid shoe.
Figure 13:
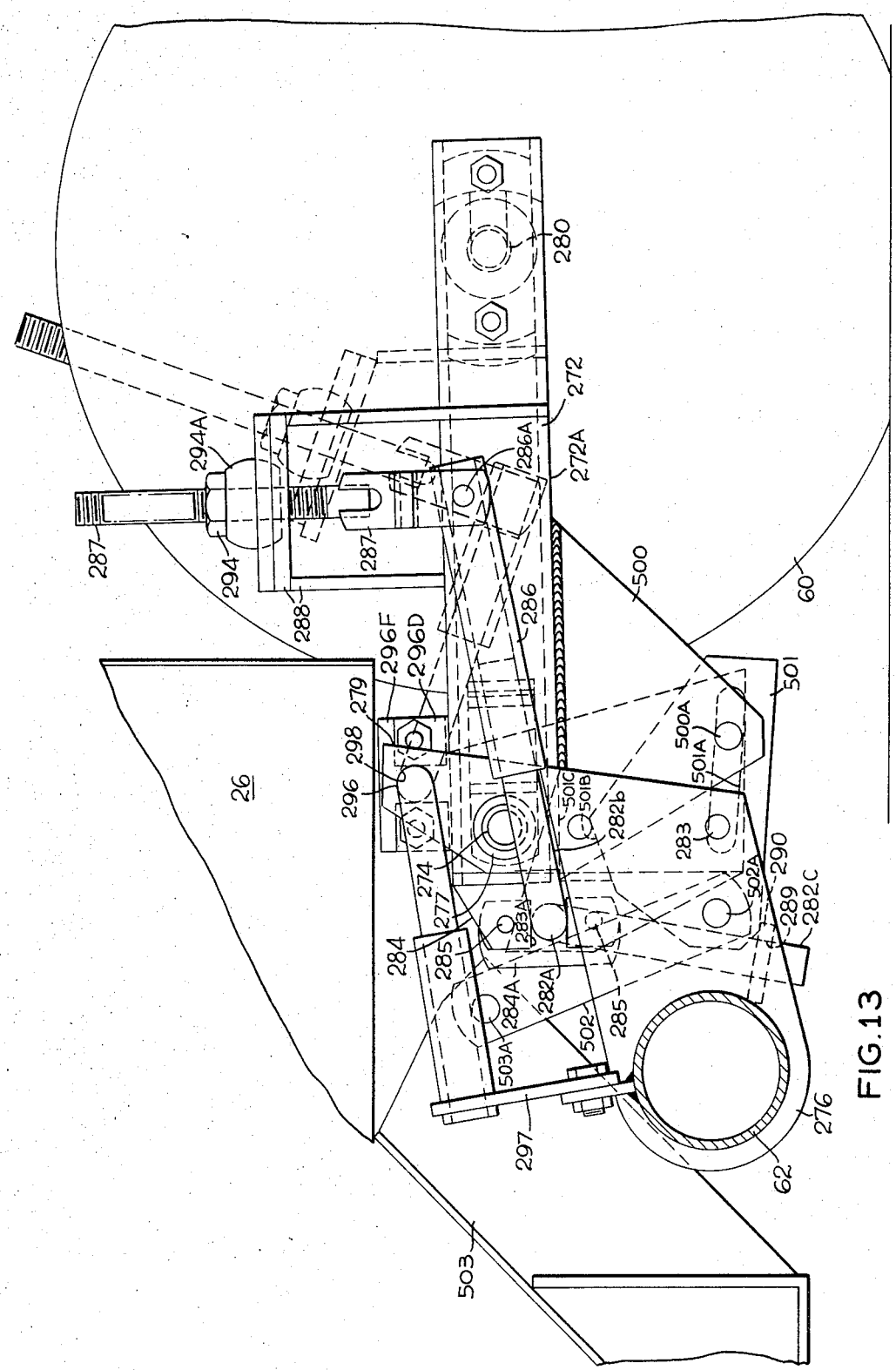
FIG. 13 is an enlarged, left end view of the wheel assembly.

A plurality of adjustable skid shoes 66 are mounted on the main frame behind sickle mower 16 and control the minimum height of the cutter bar above ground. As FIG. 12 shows, each skid shoe 66 is provided with a hooked or curved portion 66a at its forward end which engages a pocket 66b in a pocket member 66c secured as by welding to the bottom side 66d of the main frame of the machine. The hooked portion 66a of skid shoe 66 is trapped in pocket 66b by the rear end of the sickle guard portion of stationary cutter bar 162. However, such entrapment allows for pivotal movement of each skid shoe 66 to any one of four positions, as shown in phantom lines in FIG. 12. Each skid shoe 66 is provided at its rear end with a flange or projection 66e which is pivotally connected by a pin 66f to one end of an adjustment link 66g. The other end of link 66g is provided with a hole 66h for accommodating a bolt 66i which is insertable into any one of the four adjustment holes, such as hole 66j, in an adjustment plate 66k which is rigidly secured for by welding to the rear of the main frame of the machine. In practice, the elevation of sickle mower 16 above ground can be gauged or determined by the operator's noting of which adjustment hole in plate 66k is being used.

Figure 14:
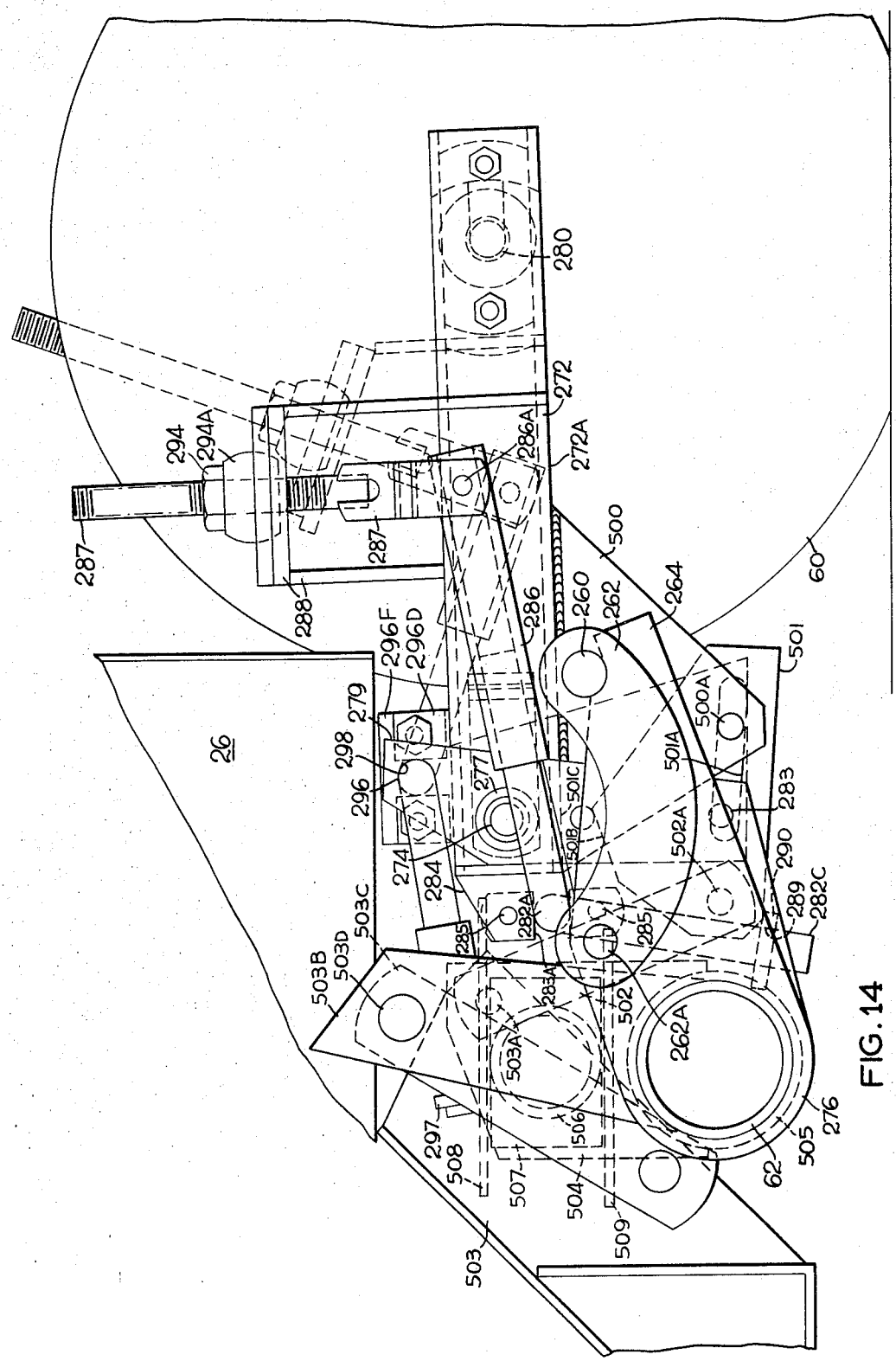
FIG. 14 is an enlarged view similar to FIG. 13 but showing additional components for a float lock system for the mower-conditioner.

As FIGS. 2 and 14 show, a float lock system is provided to assist the suspension springs or torsion bars 282 and 296 when the lift cylinder or hydraulic actuator 64 has its piston rod 258 extended to raise the mower-conditioner to transport height.

When the piston rod 258 of hydraulic actuator 64, shown in FIG. 2, is extended it causes the lever arm 262 of the bias arm-wheel fork assembly to rotate downwardly (with respect to FIG. 14) about the centerline of rockshaft 62. As FIG. 14 shows, an anchor plate 503 is fixed relative to the rockshaft centerline. An upper link 502 is attached to the anchor plate 503 at pin 503A. A lower link 501 is attached to upper link 502 by a pin 502A. Lower link 501 also slidably engages a wheel-fork crankarm 500 by means of a pin 500A on crankarm 500 and a slot 501A in lower link 501.

As the wheel fork axle 274 rotates downwardly (clockwise) upon extension of lift cylinder 64, the distance of the axle from anchor pin 503A increases. Consequently, pin 500A on crankarm 500 moves further from anchor pin 503A. As the relative motion progresses, pin 500A reaches the far end of slot 501A. At this point lower link 501 pivots upwardly and edge surface 501B on lower link 501 comes to rest against the wheel fork surface 501c. When this occurs the distance between anchor pin 503A and wheel fork crankarm pin 500A can no longer increase. Therefore, as the wheel fork axle continues to move about the centerline of rockshaft 62 the angular travel of the wheel-fork is accelerated relative to the bias arm, thereby forcing the wheel fork to pivot to its maximum upward position while the bias arms are being rotated downward relative to the mower-conditioner.

Since the residual weight of the mower-conditioner is approximately 100 lbs., the function described above assists the torsion springs 282 and 296 to overcome this residual weight and turn the wheel forks to maximum upfloat position which results in a much greater transport height than would be achieved if the wheel forks simply rotated about the centerline of rockshaft 62 through the same arc as the transport lift arm 264.

When the mower-conditioner is at its maximum elevation with piston rod 258 of actuator 64 fully extended, a float stop arm 503B is at a maximum distance from the pin holes 268 in the float stop (in the side of the main frame as shown in FIG. 2). This permits a transport link 503C to be rotated upward about pin 503D to a position where it can be pinned to the frame with a float stop pin 266 in a hole 268. This prevents return upward motion of the transport lift arm 264 if the piston rod 258 of actuator 64 is retracted. Retraction of piston rod 258 simply causes the actuator release link 262 to pivot upwardly about its captive pin 262a as the lift cylinder pin 260 departs or moves away from the transport lift arm 264.

Anchor plates 503 and 504 serve the left and right wheel forks, respectively. It will be noted that the rock shaft bearing is fixed to the mower-conditioner at its left end by bearing means 240 which are connected as at 242 by a vertical pivot and is movable laterally at its right end. Therefore, at the left end of the machine the anchor plate 503 holes pin 503A in a fixed position relative to the rockshaft centerline simply by welding that anchor plate 503 to the main frame.

At the right end the anchor plate 504 must travel laterally with the rockshaft centerline but must not rotate about the rockshaft centerline. Therefore, anchor plate 504 is welded to an anchor plate bearing 505 which journals on the rockshaft. To keep the anchor plate from turning about the rockshaft cheterline, a torsion element 506 is welded at one end to the anchor plate 504 and to a key 507 at the other end. Key 507 is free to move laterally with the rockshaft 62 but is kept from rotating in the keyway formed on the frame by bars 508 and 509.

WINDROWING MEANS

Referring to FIGS. 1, 2, 3 and 5, the windrowing means comprise a crop guiding hood 24 having a roof 300 and downwardly depending side walls 302 and 304. Hood 24, which is adapted to receive the conditioned crop expelled rearwardly from between the conditioning rolls 20 and 22 and direct it downwardly onto the ground in windrows of desired widths is narrower at its rear end than at its front end and is provided at its rear end with downwardly depending portion or stationary fluffer batt 72 and with independently adjustable fluffer batt assemblies 74 and 76 disposed on either side thereof to control the width and location (with respect to the vehicle track) of the windrow. The assemblies 74 and 76 are identical to but mirror images of each other. Therefore, a detailed description of assembly 74 will suffice for both. Assembly 74 comprises a pivotable side shield 306 and a slidably movable rear shield 308. Side shield 306 comprises a flat roof 310, substantially arcuate in shape, and a depending side or windrowing portion 312, which curves inwardly. Side shield 306 is pivotably connected, as by hinge means 314 to the main frame at side wall 302 of hood 24 and is pivotable or rotatable from the fully open or extended position (shown in FIG. 1). A side shield 306a for assembly 76 is shown in fully closed position in FIG. 1. Side shield 306 is provided on its roof 310 with a slot means 316 which is adapted to be engaged by a pin means 318 provided on the undersurface of a roof 320 of rear shield 308. Rear shield 308 comprises a flat roof 320, which is substantially rectangular in shape, and a depending rear portion or fluffer batt 322.

The roof 320 of rear shield 308 is disposed on or overlies roof 300 of hood 24 and is slidable transversely (normally) with respect to the fore and aft centerline of the mower-conditioner from an open position on the left side of the machine (shown in FIG. 1) to a closed position shown at the right side in FIG. 1. Rear shield 308 is guided for linear sliding movement bar a bar or retainer 322a which is secured on the outside of roof 300 of hood 24 and by a bracket 324 which is secured to a flange 324a on stationary fluffer batt 72. It is to be understood that pivotal or rotary movement of side shield 306 effects corresponding sliding linear movement of rear shield 308 through pin means 318 and slot means 316 which effects a conversion of rotary to linear motion. Furthermore, in all operating positions, roof 300 of hood 24 and the roofs 310 and 320 of side shield 306 and rear shield 308, respectively, overlap with each other so as to provide a totally closed roof surface. Similarly, the depending portions 72, 312 and 322 cooperate with each other in all operating positions to provide a continuous fluffer batt at the rear of the machine.

Each assembly 74 and 76 is movable or adjustable independently of the other. However, when both assemblies are fully closed, the rear shields approach each other at the center of hood 24, to produce a narrow windrow.

Operation of the mower-conditioner with the assemblies 74 and 76 both fully closed provides a windrow of the approximate width of stationary fluffer batt 72 and centered with respect to the path of travel of the machine. To obtain a full windrow, both assemblies 74 and 76 are moved to fully open position. To shift the location of the windrow with respect to the path of travel of the machine, either or both assembly 74 and 76 are adjusted accordingly.

As FIG. 2 shows, roof 300 of hood 24 is internally arched and otherwise shaped so that the crop expelled rearwardly from between the rolls 20 and 22 is deflected thereby and by the depending portions or fluffer batts 72 and 322, downwardly in a straight vertical line onto the ground. This ensures an evenly-spread, fluffy, well-aerated, rapid-drying and easily picked up windrow and eliminates scattering or blowing of the crop outwardly from the sides or rear of the machine.

As is apparent, hood 24 and assemblies 74 and 76 are preferably fabricated of sheet metal which is internally braced and strengthened by appropriately placed angle irons and structural members, generally designated 326.

As FIG. 2 shows, hood 24 is supported at its front end on the main frame by means of a tubular support member 328 which spans and is rigidly connected to the side walls 12 and 14 of the main frame.

The entire roof is comprised of a fixed center section 300 and two extendible elements 310 and 320 at each side which are actuated by and in conjunction with selection of windrow width. The roof 300 and the roofs 310 and 320 of the assemblies 74 and 76 direct the crop in its rearward travel to the fluffer batts 72 and 322. The fluffer batts interrupt the high velocity flow of the crop and causes it to fall lightly to the ground. The movable windrowing portions 312 together with the fixed side walls 302 engage the flowing crop from the sides to defect it from a full width swath as it comes out of the conditioning rolls, into any desirable width windrow. The windrow portion 74 is made up of two sections, a stationary section 302 and a swingable section 306. The fixed portion 302 is attached between the roof and the main frame side sheets and the movable curved rear sections. All of the above elements cooperate to provide an unimpeded flow of the crop through the windrow forming means.

I claim:

1. Adjustable windrowing means for an agricultural machine wherein a cut crop is propelled rearwardly and is to be directed downwardly onto the ground into windrows comprising:
   a hood having a roof narrower at the rear than at the front,
   a pair of side shields, one on each side of said hood,
   each side shield comprising a roof and a depending portion,
   means for pivotably connecting each side shield to said hood,
   a pair of movable rear shields, one for each side of said hood,
   each rear shield comprising a roof and a depending portion,
   each rear shield being supported between said hood and its associated side shield, and means for connecting each rear shield to its associated side shield so that each rear shield is movable with its associated side shield between open and closed positions.

2. Adjustable windrowing means according to claim 1 wherein each of said end shields is slidably movable transversely to the fore and aft center line of said machine and including guide means on said hood for guiding the sliding movement of said end shields.

3. Adjustable windrowing means according to claim 2 wherein said end shields move along a path which is normal to said center line and wherein said means for connecting each rear shield to its associated side shield effects conversion of the pivotal motion of said side shield to linear motion of said end shield.

4. Adjustable windrowing means according to claim 3 wherein said hood comprises a depending portion at the rear thereof and wherein said depending portions of said rear shields cooperate therewith to provide a straight fluffer batt of variable width at the rear of said machine.

5. Adjustable windrowing means according to claim 4 wherein the roofs of a side shield and its associated end shield cooperate with the roof of said hood to provide an unbroken surface.

6. Adjustable windrowing means according to claim 5 wherein said means for connecting each rear shield to its associated side shield comprises pin means on said rear shield and recess means on said side shield.

* * * * *